(12) United States Patent
Ostrowski et al.

(10) Patent No.: US 8,576,673 B2
(45) Date of Patent: Nov. 5, 2013

(54) RECORDING HEAD FOR HEAT ASSISTED MAGNETIC RECORDING WITH A SIDE LOBE BLOCKER

(75) Inventors: Mark Henry Ostrowski, Lakeville, MN (US); Jie Zou, Eden Prairie, MN (US); Amit Itagi, Eden Prairie, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 79 days.

(21) Appl. No.: 13/280,981

(22) Filed: Oct. 25, 2011

(65) Prior Publication Data

US 2013/0100783 A1  Apr. 25, 2013

(51) Int. Cl.
*G11B 11/00* (2006.01)
(52) U.S. Cl.
USPC ............ 369/13.33; 369/112.27; 360/125.31
(58) Field of Classification Search
USPC .......... 369/13.33, 13.32, 13.24, 13.14, 13.03, 369/13.12, 13.13, 13.01, 13.35, 13.17, 369/112.27; 360/59, 125.31, 125.74, 360/125.75
See application file for complete search history.

(56) References Cited

U.S. PATENT DOCUMENTS

| | | | |
|---|---|---|---|
| 6,944,112 B2* | 9/2005 | Challener | 369/112.27 |
| 6,982,844 B2* | 1/2006 | Rettner et al. | 360/59 |
| 7,215,629 B2* | 5/2007 | Eppler | 369/112.27 |
| 7,272,079 B2* | 9/2007 | Challener | 369/13.17 |
| 7,330,404 B2* | 2/2008 | Peng et al. | 369/13.33 |
| 7,412,143 B2* | 8/2008 | Rottmayer et al. | 385/129 |
| 8,289,650 B2* | 10/2012 | Seigler et al. | 360/125.3 |
| 8,339,740 B2* | 12/2012 | Zou et al. | 360/125.31 |
| 8,391,108 B2* | 3/2013 | Peng et al. | 369/13.33 |
| 2003/0112542 A1 | 6/2003 | Rettner et al. | |
| 2003/0235121 A1 | 12/2003 | Eppler | |
| 2004/0001420 A1 | 1/2004 | Challener | |
| 2005/0041950 A1 | 2/2005 | Rottmayer et al. | |
| 2005/0078565 A1 | 4/2005 | Peng et al. | |
| 2005/0289576 A1 | 12/2005 | Challener | |
| 2008/0170319 A1 | 7/2008 | Seigler et al. | |
| 2009/0073858 A1 | 3/2009 | Seigler et al. | |
| 2010/0214685 A1 | 8/2010 | Seigler et al. | |

OTHER PUBLICATIONS

Ikkawi, R., et al., "Near-Field Optical Transducer for Heat-Assisted Magnetic Recording for Beyond-10-Tbit/in2 Densities," Journal of Nanoelectronics and Optoelectronics, vol. 3, No. 1, pp. 44-54, 2008.

* cited by examiner

*Primary Examiner* — Ali Neyzari
(74) *Attorney, Agent, or Firm* — Mueting Raasch & Gebhardt PA

(57) ABSTRACT

An apparatus includes a waveguide having a core layer, a near field transducer having an end positioned adjacent to a first surface, a first magnetic pole having an end positioned adjacent to the first surface, and a side lobe blocker adjacent to the first surface and having portions on opposite sides of the first magnetic pole and the near field transducer, wherein the side lobe blocker forms an aperture at an end of the core layer adjacent to the first surface.

20 Claims, 6 Drawing Sheets

RECORDING HEAD FOR HEAT ASSISTED MAGNETIC RECORDING WITH A SIDE LOBE BLOCKER

BACKGROUND

In heat assisted magnetic recording (HAMR), information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region. Heat assisted magnetic recording is also referred to a thermally assisted magnetic recording.

Current HAMR recording head designs generally have a near field transducer (NFT) that is capable of focusing light to a spot size smaller than the diffraction limit. The NFT is designed to reach local surface-plasmon when subjected to light at a particular wavelength. At resonance, a high electric field surrounding the NFT appears, due to the collective oscillation of electrons in the metal. A portion of the field will tunnel into the storage medium and get absorbed, raising the temperature of the medium locally for recording. To help dissipate the heat, a heat sink can be added to the NFT.

It would be desirable to confine the light to a region under the near field transducer at the air bearing surface.

SUMMARY

In a first aspect, the disclosure provides an apparatus including a waveguide having a core layer, a near field transducer having an end positioned adjacent to an air bearing surface, a first magnetic pole having an end positioned adjacent to the first surface, and a side lobe blocker adjacent to the first surface and having portions on opposite sides of the first magnetic pole and the near field transducer, wherein the side lobe blocker forms an aperture at an end of the core layer adjacent to the first surface.

These and other features and advantages which characterize the various embodiments of the present disclosure can be understood in view of the following detailed discussion and the accompanying drawings.

DETAILED DESCRIPTION

In one aspect, this disclosure provides an apparatus including a side lobe blocker that is capable of blocking the side lobes in a spot of light formed by a near field transducer in a recording head.

Figure 1:
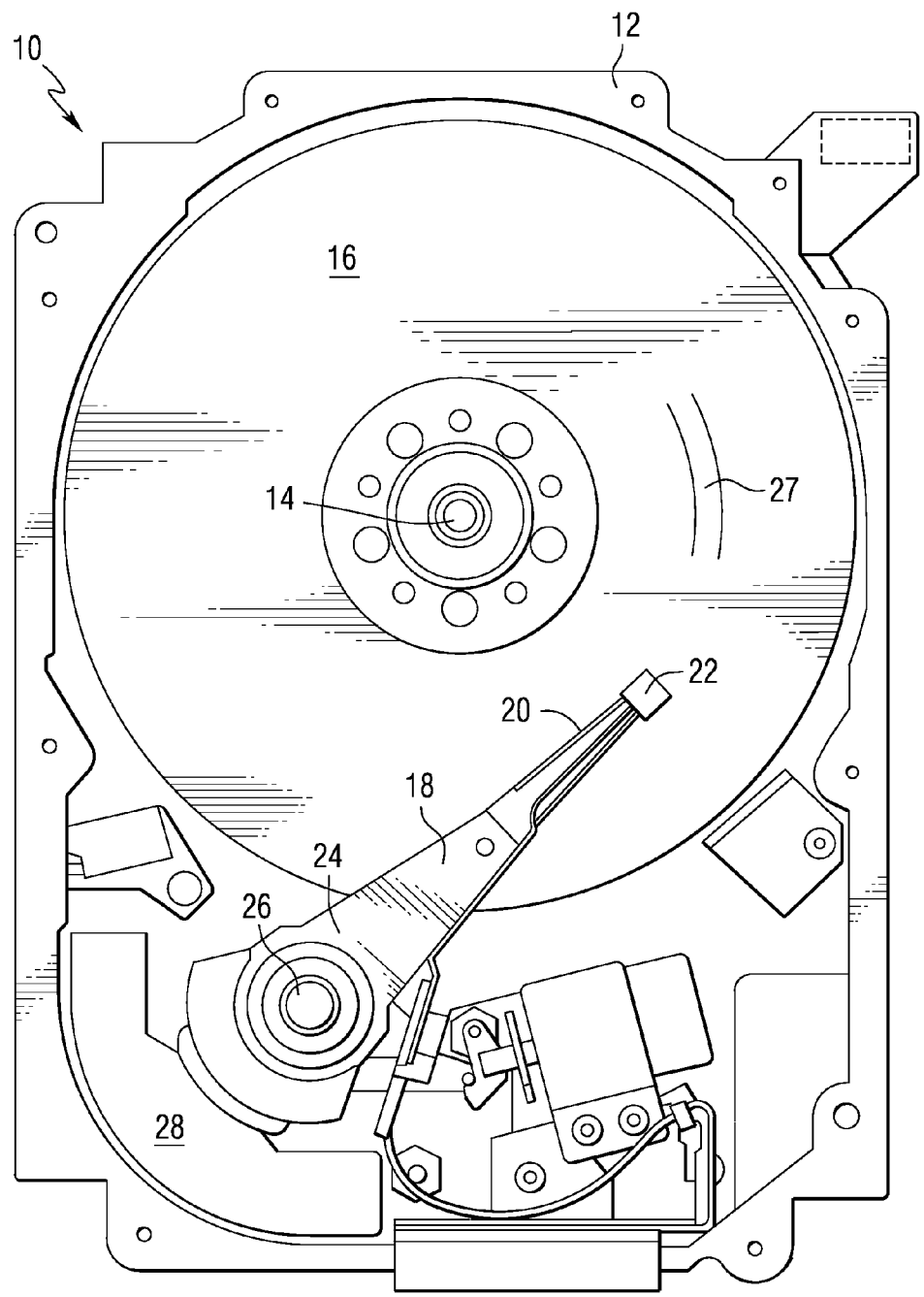
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with an aspect of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one positioning member, such as arm 18, is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide in the form of a solid immersion minor on a slider to guide light to the storage media for localized heating of the storage media. While FIG. 1 shows a disc drive, the disclosure can be applied to other devices that include a solid immersion mirror and a near field transducer for concentrating light to a small spot.

Figure 2:
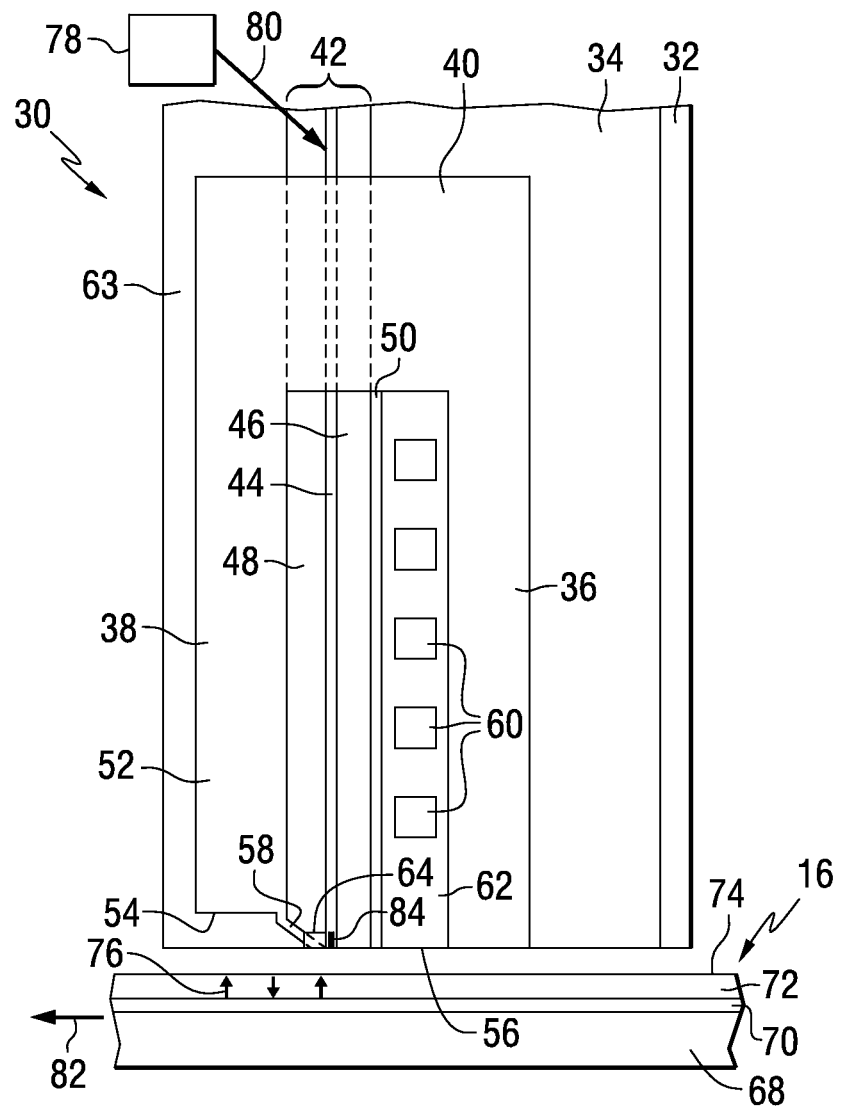
FIG. 2 is a side elevation view of a portion of a recording head constructed in accordance with an aspect of the disclosure.

FIG. 2 is a side elevation view of portions of a recording head constructed in accordance with an aspect of the disclosure, and positioned near a storage media. The recording head 30 includes a substrate 32, a base coat 34 on the reader section, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A minor 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 (also called a first surface) of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as, for example, gold (Au). Only features of the recording head that are relevant to the disclosure are shown in FIG. 2. It will be recognized by those skilled in the art that the recording head can include other elements, such as a read sensor and associated components.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media (for example patterned media) where it may be desirable to concentrate light to a small spot.

HAMR requires optical designs capable of focusing light to a spot size smaller than the diffraction limit. In the recording head of FIG. 2, light is focused to a spot size smaller than the diffraction limit by a solid immersion mirror (SIM), fabricated on a planar waveguide, and a near field transducer (NFT), placed near to the focal point of the SIM.

Figure 3:
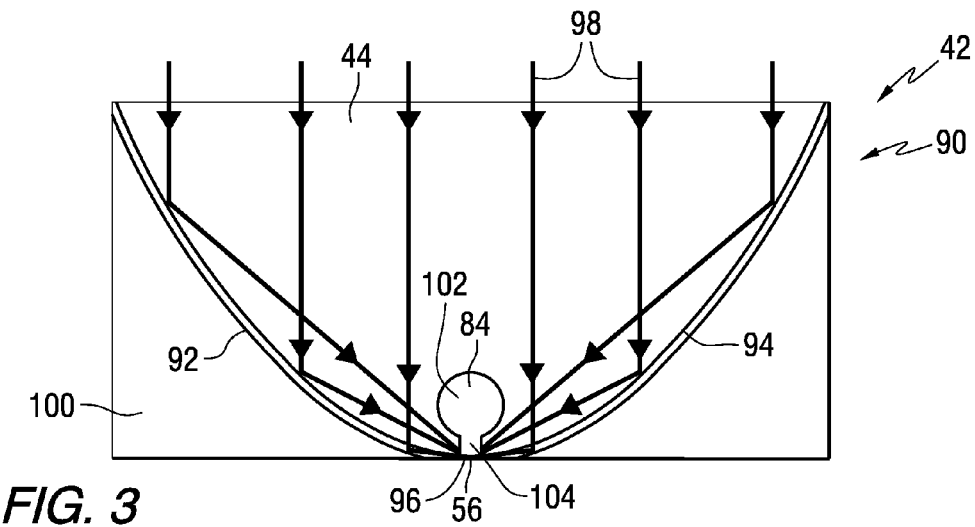
FIG. 3 is a cross-sectional view of a portion of a solid immersion minor.

FIG. 3 is a cross-sectional view of a solid immersion mirror (SIM) 90 formed in the planar waveguide 42 that can be used in the recording head of FIG. 2. The solid immersion minor includes a core layer 44 having sides 92 and 94 that are shaped to reflect light toward a focal point 96 as illustrated by arrows 98. In one example, the sides can have a parabolic shape and can be lined with a reflective material. A dielectric material 100, which can be for example $Al_2O_3$, is position adjacent to the SIM sides. The core material can be for example, $Ta_2O_5$. A near field transducer 84 is positioned adjacent to or embedded in the core layer adjacent to the focal point. In the HAMR recording head of FIG. 2, the magnetic pole 58 (not shown in this view) has an end that is positioned adjacent to the NFT. While FIG. 3 shows a solid immersion minor, other types of waveguides can also be used. For example, the waveguide can be a channel waveguide positioned such that an end of the waveguide is at or near the air bearing surface of the recording head. Furthermore, the disclosure is not limited to any particular NFT design or shape. The near field transducer in the example of FIG. 3 includes a disk portion 102 and a peg portion 104 extending between the disk portion and the air bearing surface 56. However, other types of near field transducers can be used, including single or multiple piece NFTs.

Figure 9:
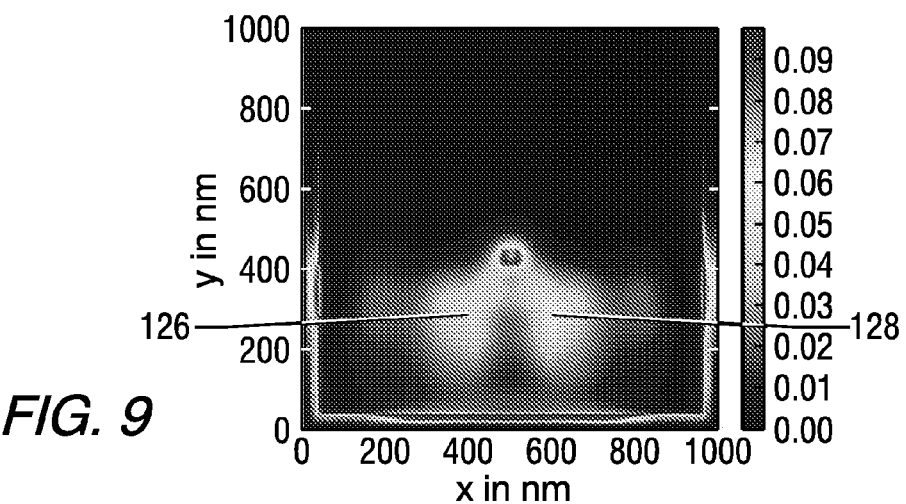
Figure 10:
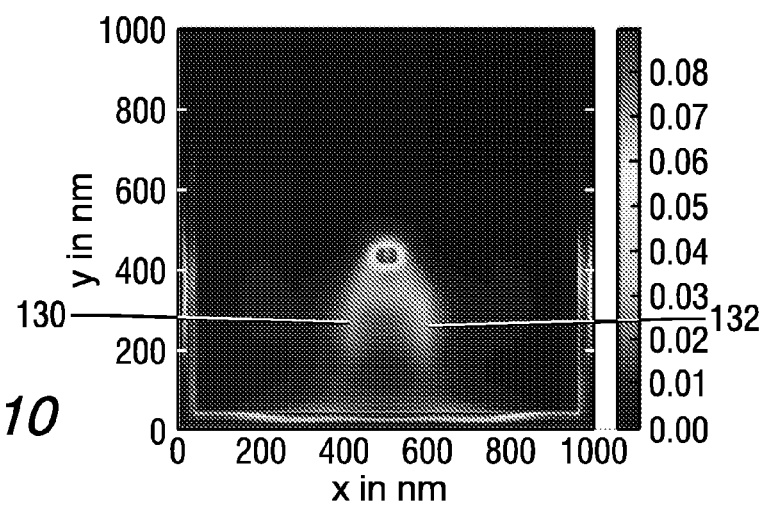

In thermally assisted magnetic recording systems, information bits are recorded on a data storage medium at elevated temperatures, and the data bit dimension can be determined by the dimensions of the heated area in the storage medium. Thus, it is desirable to produce a well defined spot of optical energy on the storage medium to control the bit dimensions. When light exits the end of a waveguide adjacent to the air bearing surface of a recording head, the spot of light formed on an adjacent data storage medium may include a portion adjacent to an end of the NFT and side lobes the extend outwardly and are generally located adjacent to an end of the waveguide core layer. These side lobes may increase the size of the heated portion of the storage medium, resulting in an increase in the information bit size, or adversely affecting data bit written in adjacent tracks on the storage medium. Results of simulations showing the side lobes are shown in FIGS. 9 and 10, discussed below.

Figure 4:
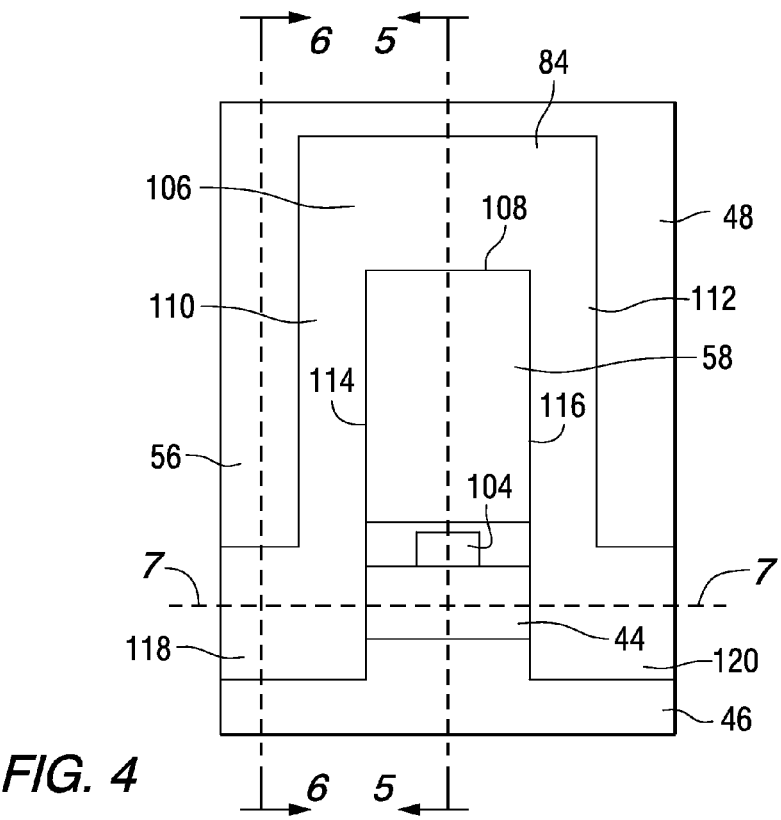
FIG. 4 is a plan view of a magnetic pole, near field transducer and waveguide at an air bearing surface.

FIG. 4 shows the schematic plan view of a portion of the air bearing surface (i.e., the first surface) 56 of the HAMR head of FIG. 2, where the peg 104 is the only visible part of the NFT. SIM side walls are not shown. In FIG. 4, the heat sink 84 is shown to include a first portion 106 positioned adjacent to a side 108 of the magnetic pole 58, and second and third portions 110 and 112 positioned adjacent to sides 114 and 116 of the magnetic pole. Portions 110 and 112 extend along the air bearing surface such that they are positioned on opposite sides of the magnetic pole and also on opposite sides of the NFT. Portions 110 and 112 also cover a portion of the SIM core that lies adjacent to the ABS, and form a side lobe blocker. Tabs 118 and 120 extend from portions 110 and 112 to shield the remainder of the core from the ABS.

Figure 5:
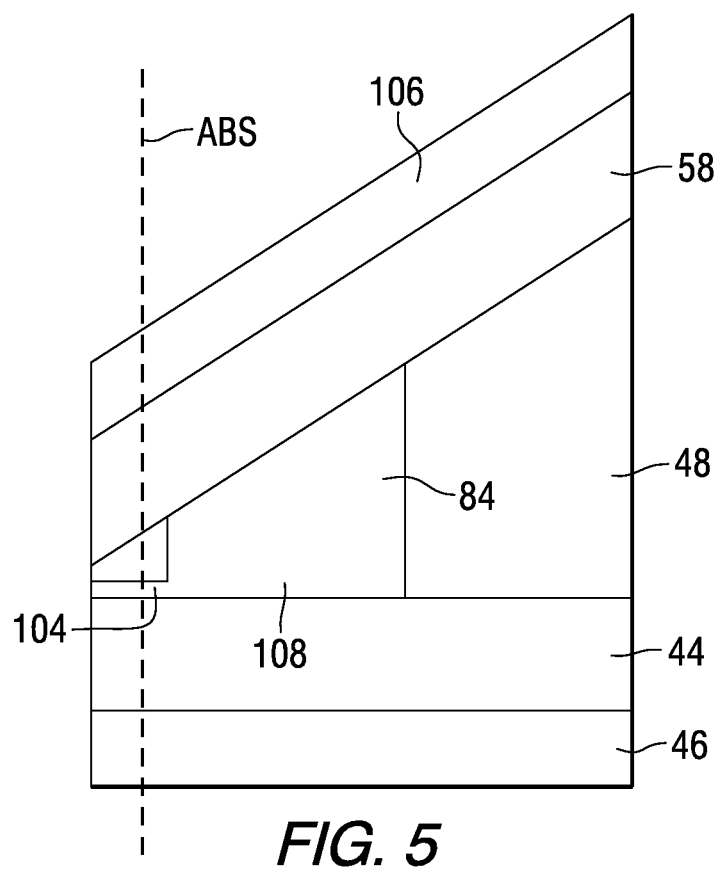
FIG. 5 is a cross-sectional view of the magnetic pole, near field transducer and waveguide of FIG. 4 taken along line 5-5.

FIG. 5 is a cross-sectional view of the head of FIG. 4 taken along line 5-5 at the center of the head. Heat sink portion 106 is shown as a layer on top of the magnetic pole 58 and extends to the ABS. This portion can be relatively thick to serve as an effective heat sink. However, at the sides of the pole, the portions 110 and 112 (shown in FIG. 4) of the heat sink may be very thin, having a thickness from about 30 nm to about 1000 nm. In one example a thickness greater than 150 nm is desired to provide an effective heat sink.

FIG. 5 is shown to include materials that extend across the position of the air bearing surface (ABS). However, the portions to the left of the ABS line in FIG. 5 will be removed when the structure is in a finished recording head.

Figure 6:
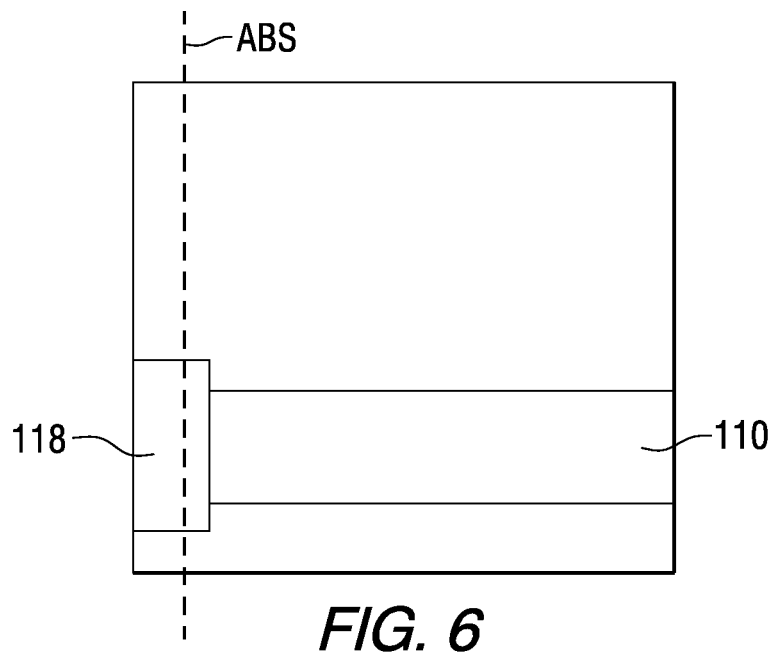
FIG. 6 is a cross-sectional view of a portion of the recording head of FIG. 4 taken along line 6-6.

FIG. 6 is a cross-sectional view of the head of FIG. 4 taken along line 6-6. The side lobe blocker structure blocks the light out of the core, at the side of the magnetic pole 58. FIG. 6 is shown to include materials that extend across the position of the air bearing surface (ABS). However, the portions to the left of the ABS line in FIG. 6 will be removed when the structure is in a finished recording head.

Figure 7:
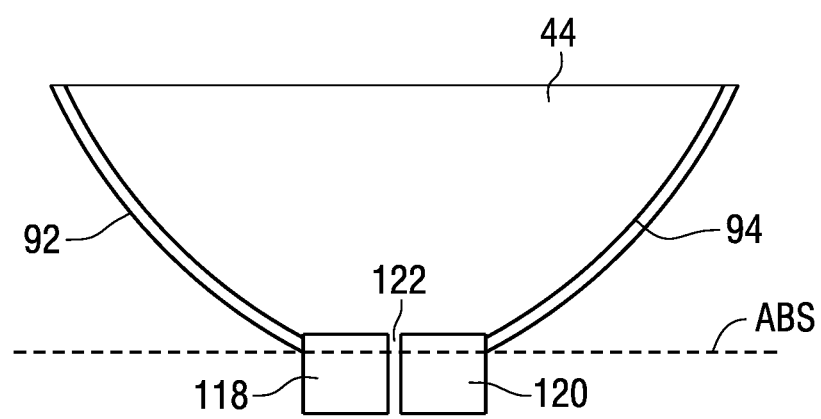
FIG. 7 is a cross-sectional view of a portion of the solid immersion minor of FIG. 4 taken along line 7-7.

FIG. 7 is a top down view of a SIM, taken along line 7-7 in FIG. 4 in a direction into the plane of FIG. 4. Light passes through the SIM and exits the SIM adjacent to the air bearing surface of the recording head. The side lobe blocker structure forms an aperture 122 between tabs 118 and 120 at the ABS end of the SIM, and blocks the side lobes of light passing through the aperture. The side lobe blocker should be very shallow in a direction perpendicular to the ABS; otherwise it would significantly degrade the NFT coupling efficiency. In some embodiments, the thickness of the side lobe blocker in direction into the ABS can be in a range from about 20 nm to about 100 nm. In other embodiments, the thickness of the side lobe blocker in direction into the ABS can be in a range from about 20 nm to about 500 nm. In one example, the thickness is about 40 nm to balance the SIM side lobe blocking properties versus lowering the coupling efficiency of the NFT. The portions below the ABS line in FIG. 7 will be removed when the structure is in a finished recording head.

Light that is not coupled into the NFT is scattered and some of it will reach the media surface as background light. When the NFT is at resonance with the incoming light, the media underneath the peg sees the elevated light energy while there is very low intensity in the background light.

Figure 8:
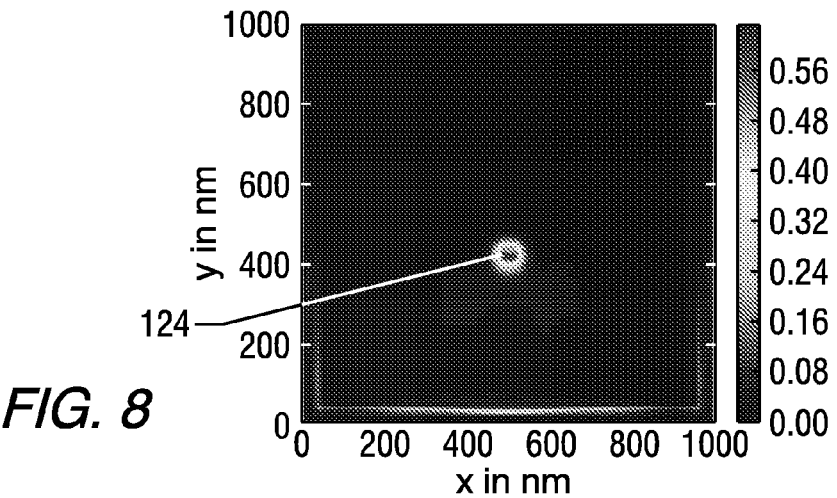
FIGS. 8, 9 and 10 are representations of a calculated electric field in a data storage medium.

FIG. 8 illustrates the modeled $|E|^2$ of the light (where E is the electric field) in the HAMR media produced by an NFT in resonance. A small well defined spot 124 is produced on the storage media. However, in volume production the NFTs may be off resonance due to process variations on NFT disk size and peg length. Such variations in the NFTs can result in two additional light energy hot spots that may appear adjacent to the ABS end of the core of the waveguide, which are called the SIM side lobes. Examples of such side lobes are shown as items 126 and 128 of FIG. 9, which shows the modeled $|E|^2$ of the light striking the surface of a HAMR media, with the NFT at an off resonance state. The appearance of SIM side lobes can also be caused by deviation of the SIM sides from a perfect parabolic shape or if the SIM focal point is at the wrong location, both of which may occur in heads fabricated in volume production due to process variations.

The side lobe blocker structure of FIG. 4 creates an aperture adjacent to the end of the core layer. The pole heat sink extends along the sides of the pole, on opposite sides of the NFT, and over the end of the SIM core layer to shield the core at the sides of the pole. This design essentially makes the pole heat sink serve a dual-purpose, to dissipate heat and to also serve as a SIM side lobe blocker.

FIG. 10 shows the modeled $|E|^2$ of the light in the HAMR media with the NFT at an off resonance state, for a head that includes a SIM side lobe blocker. FIG. 10 shows that the SIM side lobe blocker significantly reduces the intensity of the side lobes 130 and 132.

The described embodiments may significantly reduce side lobes for many of the heads in volume production. The embodiments can be fabricated using a relatively simple process with only a few additional process steps beyond the previously existing process flow. The shield is compatible with an existing pole heat sink. With the design in FIG. 4, the modified pole heat sink can serve double-duty also as both a heat sink and a side lobe blocker. A wide range of materials can be selected for the SIM side lobe blocker, including, for example, Cr, Ru, Rh, etc.

In another embodiment, a heat sink can include portions that serve as a side blocker. This embodiment provides an apparatus including a near field transducer having an end positioned adjacent to a first surface, a first magnetic pole having an end positioned adjacent to the first surface, and a heat sink positioned adjacent to the first surface and having portions on opposite sides of the first magnetic pole and the near field transducer, wherein the heat sink forms an aperture adjacent to the first surface. An example of this embodiment includes the side lobe blocking structure of FIG. 4 as a component or integral part of the heat sink 64 of FIG. 2.

In another aspect, this disclosure encompasses a data storage device that includes a recording head having a side lobe blocker. Such an apparatus includes a storage medium; a recording head including a waveguide having a core layer, a near field transducer positioned adjacent to an air bearing surface, a first magnetic pole, and a side lobe blocker adjacent to an air bearing surface and having portions on opposite sides of the first magnetic pole and the near field transducer, wherein the side lobe blocker forms an aperture at an end of the core layer adjacent to the air bearing surface; and a positioning member for positioning the recording head adjacent to the storage medium.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a waveguide having a core layer;
   a near field transducer having an end positioned adjacent to a first surface;
   a first magnetic pole having an end positioned adjacent to the first surface; and
   a side lobe blocker positioned adjacent to the first surface and having portions on opposite sides of the first magnetic pole and the near field transducer, wherein the side lobe blocker forms an aperture at an end of the core layer adjacent to the first surface.

2. The apparatus of claim 1, wherein a portion of the near field transducer is positioned in the aperture.

3. The apparatus of claim 1, wherein a heat sink is positioned adjacent to the first magnetic pole, and the side lobe blocker is a part of the heat sink.

4. The apparatus of claim 1, wherein the side lobe blocker comprises:
   a first portion positioned adjacent to the first surface and adjacent to a first side of the first magnetic pole opposite the near field transducer;
   a second portion positioned adjacent to the first surface and adjacent to a second side of the first magnetic pole; and
   a third portion positioned adjacent to the first surface and adjacent to a third side of the first magnetic pole.

5. The apparatus of claim 4, wherein the second and third portions are further positioned on opposite sides of the near field transducer.

6. The apparatus of claim 5, wherein the side lobe blocker further comprises:
   a first tab connected to the second portion; and
   a second tab connected to the third portion.

7. The apparatus of claim 4, wherein the second and third portions have a thickness in a range of from about 30 nm to about 1000 nm.

8. The apparatus of claim 1, wherein the thickness of the side lobe blocker at an end of the core layer is in a range of from about 20 nm to about 500 nm.

9. The apparatus of claim 1, wherein the side lobe blocker comprises at least one of Cr, Rh or Ru.

10. An apparatus comprising:
    a near field transducer having an end positioned adjacent to a first surface;
    a first magnetic pole having an end positioned adjacent to the first surface; and
    a heat sink positioned adjacent to the first surface and having portions on opposite sides of the first magnetic pole and the near field transducer, wherein the heat sink forms an aperture adjacent to the first surface.

11. The apparatus of claim 10, wherein a portion of the near field transducer is positioned in the aperture.

12. The apparatus of claim 10, wherein the heat sink comprises:

a first portion positioned adjacent to the first surface and adjacent to a first side of the first magnetic pole opposite the near field transducer;

a second portion positioned adjacent to the first surface and adjacent to a second side of the first magnetic pole; and a third portion positioned adjacent to the first surface and adjacent to a third side of the first magnetic pole.

13. The apparatus of claim 12, wherein the second and third portions are further positioned on opposite sides of the near field transducer.

14. The apparatus of claim 13, wherein the heat sink further comprises:

a first tab connected to the second portion; and a second tab connected to the third portion.

15. The apparatus of claim 12, wherein the second and third portions have a thickness in a range of from about 30 nm to about 1000 nm.

16. The apparatus of claim 10, wherein the thickness of the heat sink portion adjacent to the aperture is in a range of from about 20 nm to about 500 nm.

17. The apparatus of claim 1, wherein the heat sink comprises at least one of Cr, Rh or Ru.

18. An apparatus comprising:

a storage medium;

a recording head including a waveguide having a core layer, a near field transducer having an end positioned adjacent to an air bearing surface, a first magnetic pole having an end positioned adjacent to the air bearing surface, and a side lobe blocker adjacent to the air bearing surface and having portions on opposite sides of the first magnetic pole and the near field transducer, wherein the side lobe blocker forms an aperture at an end of the core layer adjacent to the air bearing surface; and a positioning member for positioning the recording head adjacent to the storage medium.

19. The apparatus of claim 18, wherein the side lobe blocker comprises:

a first portion positioned adjacent to the air bearing surface and adjacent to a first side of the first magnetic pole opposite the near field transducer;

a second portion positioned adjacent to the air bearing surface and adjacent to a second side of the first magnetic pole; and a third portion positioned adjacent to the air bearing surface and adjacent to a third side of the first magnetic pole.

20. The apparatus of claim 19, wherein the second and third portions are further positioned on opposite sides of the near field transducer, and the side lobe blocker further comprises:

a first tab connected to the second portion; and a second tab connected to the third portion.

* * * * *